Oct. 13, 1953 L. H. CONNELL 2,655,563

MAGNETIC REPRODUCING SERVICE FOR AUTOMOBILES

Filed March 31, 1947 3 Sheets-Sheet 1

INVENTOR.
LAWRENCE H. CONNELL
BY
Parker & Burton
ATTORNEYS

INVENTOR.
LAWRENCE H. CONNELL
BY
Parker & Burton
ATTORNEYS

INVENTOR.
LAWRENCE H. CONNELL
BY Parker & Burton
ATTORNEYS

UNITED STATES PATENT OFFICE 2,655,563

MAGNETIC REPRODUCING SERVICE FOR AUTOMOBILES

Lawrence H. Connell, Detroit, Mich.

Application March 31, 1947, Serial No. 738,439

11 Claims. (Cl. 179—100.2)

This invention relates to improvements in magnetic sound recorders and reproducers and an improved system and assembly including the same.

It relates particularly to improvements in magnetic sound reproducers in which the sound is recorded as magnetic variations on a linear para-magnetic member such as wire.

One object is to provide a sound recorder and reproducer adapted for use in a motor vehicle and wherein the sound is reproduced through the conventional radio carried by the vehicle. A meritorious feature is that the system and assembly wherein the reproducer is included with the radio and battery in a vehicle is so constructed and arranged within the vehicle as to eliminate undesirable interference.

Another object is to provide a magnetic reproducer so constructed as to facilitate replacement of the magnetized member which carries the record to be reproduced whereby different spools of magnetized wire may be quickly substituted one for the other. A meritorious feature is that the reproducer consists of a relatively permanently positioned portion and a replaceable spool carrying magazine portion, hereinafter termed the magazine and these portions are so constructed and adapted to be fitted together that the magazine portion may be readily and cooperatively associated with or detached from the permanently positioned portion.

More particularly the permanently positioned portion includes a rotatable power driven driving member and a magnetic head, and in automobile use such portion is mounted within the vehicle body and electrically coupled with a radio mounted therein and with a conventional storage battery with which the vehicle is provided. The replaceable magazine portion includes a length of magnetized wire wound upon two wire carrying spools and a capstan engaging the wire, all carried within the magazine casing. The replaceable portion is adapted to be coupled with the permanently positioned portion to position the wire with respect to the magnetic head of the permanently positioned portion and with the capstan coupled with the rotatable driving member to be driven thereby.

Another object is to provide a magnetic wire reproducer wherein the magnetized wire is held in traveling contact with the two pole pieces of the magnetic head only adjacent to the gap between the pole pieces. An advantage of this construction is that the voltage output is substantially bettered by causing the wire to be held against only those surfaces of the pole pieces immediately adjacent to the gap.

A meritorious feature is that the cooperating wire engaging surfaces of the pole pieces against which the wire is held by the wire holding member are flattened transversely of the wire and the wire is therefore permitted to shift laterally between the pole pieces and said wire holding member and wherefore the tendency of the wire to wear a groove within the pole pieces is minimized.

A further object is to provide a wire recorder wherein the magnetized wire is wound upon two spools and that portion of the wire extending between the spools is passed over a rotatable capstan to be advanced thereby at a constant rate from one spool to the other. Various meritorious features are present in this construction such as: the wire is frictionally driven by the capstan to rotate the spools; one spool is permitted to overrun the other; the wire is level wound upon the winding spool; the wire is maintained under tension as it extends from the capstan to each spool; the levelwind mechanism is controlled by the movement of the wire; and the magnetic head engages the wire where wound about the capstan and where it is held under constant tension free from slackness and non-uniform stretch.

Obviously the construction is adapted not only for automobile use as shown in the embodiment illustrated but for home use or wherever desired. The construction is such that a user even though unskillful can readily replace a magazine containing a new record for a magazine the record of which has once been played.

Other objects, advantages and meritorious features will more fully appear from the following specification, claims and accompanying drawings wherein:

Figure 1:
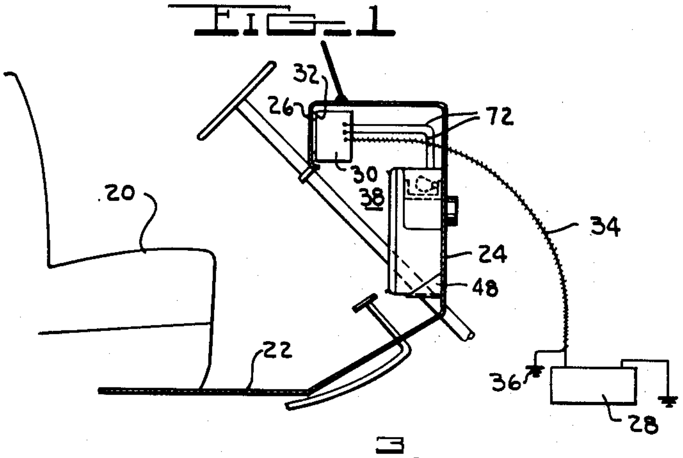
Figure 1 is a vertical cross sectional view through the driver's seat compartment of an automobile illustrating an embodiment of my invention therein.
Figure 2:
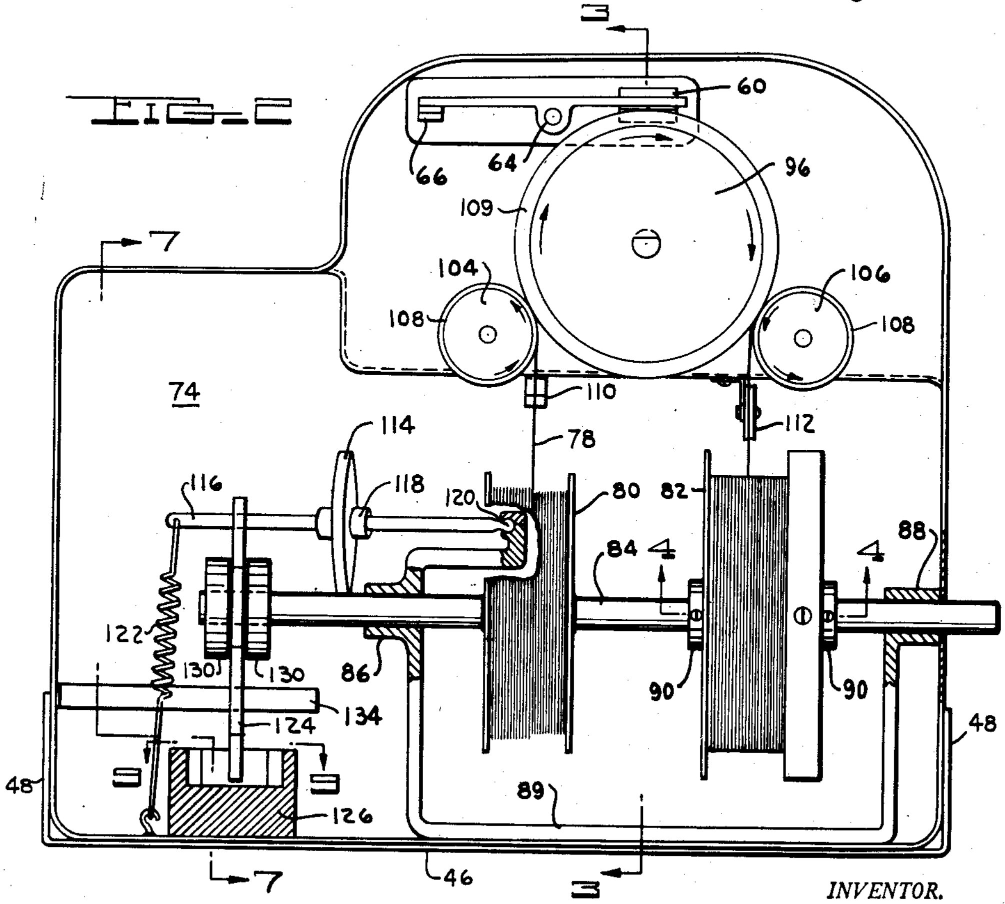
Figure 2 is an elevation partly broken away through the magazine of the sound reproducer mechanism.

In the drawings the driver's compartment of a motor vehicle body is illustrated as provided with a seat 20, floor 22, dash 24 and instrument panel 26. The battery 28 of the automobile is located outside of the body compartment. A conventional radio 30 is mounted upon the instrument panel 26. For reasons hereinafter set forth, I choose to insulate the radio by insulating mounting means 32 from the body instead of grounding it thereon as is the customary practice and to connect it with the battery through a power circuit by twisted leads 34, one of which leads extends directly to the battery and the other to a ground 36 on the car.

The reason for the use of a power circuit which is non-inductive (twisted leads) at least in part, is that a portion of such circuit passes in proximity to the magnetic sensitive head of the reproducer hereinafter described and by insulating the radio from the vehicle and providing a non-inductive circuit, the magnetic sensitive head is protected against disturbances due to induction. A co-axial cable might be used instead of the twisted leads.

The improved magnetic sound reproducer 38 is shown as mounted on the dash 24. Such reproducer consists of a portion 40 which may be permanently secured to the dash by bolts 42 and a replaceable magazine portion 44. Portion 40 is provided with a bottom bracket 46 and positioning side wings 48. The base of the replaceable magazine portion is receivable between the wings 48 upon the bracket 46.

The portion 40 includes an electric motor 52 driving a drive shaft 56 through conventional speed reducing mechanism 54. The drive shaft is provided with a coupling 58 adapted to attachably engage the driven shaft of the magazine portion as hereinafter described. The motor 52, speed reducer 54, drive shaft 56 and coupling 58 are housed within an enclosure 53, but the motor is shown as extending therefrom and projecting through an opening in the dash as appears in Figure 3. The enclosure 53 has an opening 55 opposite to the end of the coupling 58.

In addition to the motor this permanent portion of the apparatus includes a magnetic sensitive reproducer head 60 which is supported upon one end of a rocker arm 62 which arm is pivoted at 64 for rocking movement. The opposite end of the arm carries a counterbalance weight 66 whereby the head is supported to rest lightly upon the magnetized wire that travels over the capstan of the magazine portion, which serves to balance the head against the jar and shock of travel of the vehicle over the road. This permanently installed portion may include one or more amplifying tubes such as 68 shown in Figure 3. The head 60 is electrically connected to the amplifying tube 68 by a lead 70 and the tube is electrically connected with the radio 30 by leads 72.

Figure 3:
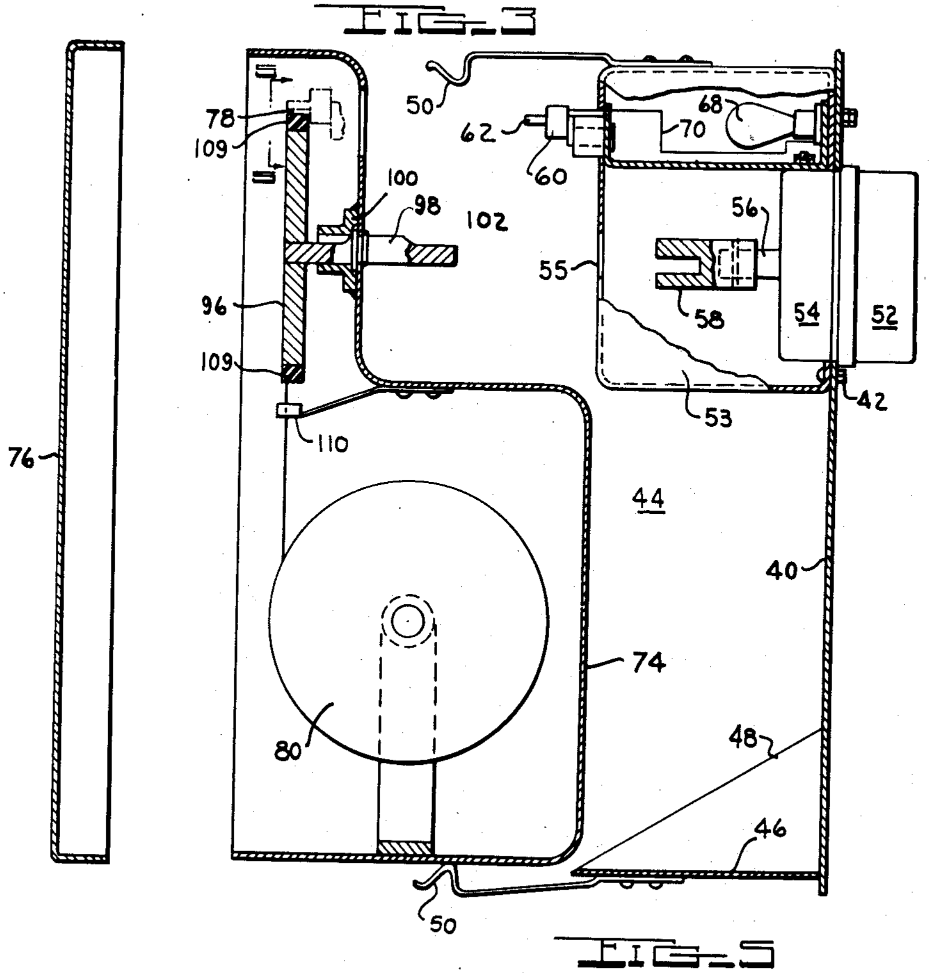
Figure 3 is a vertical cross sectional view taken on the line 3—3 of Figure 2 showing the replaceable magazine section separated from the permanently installed section.
Figure 5:
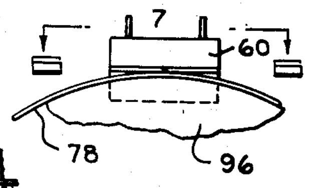
Figure 5 is a fragmentary elevation of the pole pieces, capstan and wire at the point of contact and taken on the line 5—5 of Figure 3.

The magazine or detachable portion 44 of the apparatus is shown in Figure 3 as separated from the permanently installed portion. This magazine portion comprises a casing 74 open at the front and provided with a removable press fit cover 76. Such cover might, if desired, be locked in place to permit access only to authorized persons. This casing 74 has an enlarged bottom portion adapted to seat upon the bracket 46 below the enclosure 53 of the permanently positioned portion heretofore described. This casing has an upper part of reduced depth adapted to juxtapose the front face of the enclosure 53 as shown in Figure 1 and any suitable connector such as the clamp 50 may be used to hold the magazine portion in place.

Within this casing 74 is disposed the wire carrying and winding mechanism. The linear para-magnetic member upon which the sound is magnetically imposed is termed a "wire" throughout this specification and claims and a wire is shown in the drawing thereof. It is understood that such member might take any other suitable linear form. Such linear para-magnetic member is here indicated as 78 and is shown as wound upon the reels 80 and 82.

Figure 4:
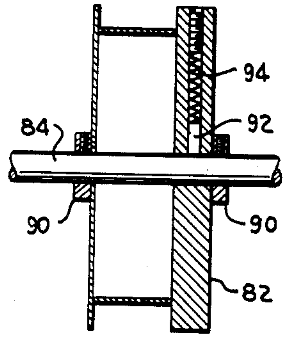
Figure 4 is a sectional view through one of the reels taken on the line 4—4 of Figure 2.
Figure 6:
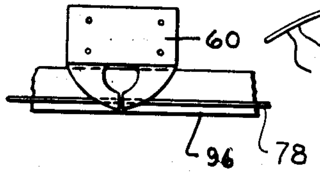
Figure 6 is a plan of a fragment of the structure shown in Figure 5 and taken on the line 6—6 of Figure 5.

Reel 80 here shown as the unwinding reel is fixed upon a shaft 84 to rotate the shaft. Such shaft is journaled within bearings 86 and 88 of a frame 89 for rotation within the bearings and axial shiftable movement therethrough. Reel 82 here shown as the winding reel is supported upon the shaft 84 and held by retaining stops 90 to shift axially with the shaft. Such reel is held frictionally to the shaft to tend to rotate therewith but is capable of variable rotation with respect thereto. A friction pin 92 is held by a spring 94 (Figure 4) to frictionally but releasably hold the reel to tend to rotate with the shaft as the shaft is rotated by the reel 80.

That portion of the wire 78 which extends between the reels passes over a capstan 96 which capstan is fixed upon a stub shaft 98 to rotate therewith. Such stub shaft 98 is journaled for rotation within the bearing 100 of the casing 74 and the opposite end of the shaft is shaped as at 102 to releasably engage within the coupling 58 of the motor driven shaft 56 of the permanently positioned portion heretofore described to be driven thereby.

A pair of idler rollers 104 and 106 are supported to hold the wire 78 closely about the capstan for a portion of its circumference in excess of 180°. These rollers are provided with suitable resilient friction facings 108. The capstan is provided with a non-magnetic facing 109. A guide 110 is shown as engaging the wire adjacent to the roller 104 and a guide 112 is shown as engaging the wire adjacent to the roller 106. The wire is held about the capstan and is frictionally driven thereby to drive the reel 80 and rotate the shaft 84 to cause the wire to unwind from the reel 80 and wind upon the reel 82.

Reel 82 is of larger diameter than reel 80. It is of larger diameter empty than reel 80 is with a length of wire wound thereupon. Reel 82 therefore maintains a nearly constant tension on that portion of the wire leading to the capstan but inasmuch as it is controlled by the movement of the wire, it will constantly tend to slip with respect to the shaft 84 so that the wire will be advanced at a constant rate of speed as determined by the rotation of the capstan. The capstan maintains a tension on that portion of the wire leaving therefrom to the unwinding reel 80 whereby the wire 78 is held closely against the periphery of the capstan and variable elastic expanse or contraction thereof upon the capstan and as it passes over the pick-up of the magnetic head is thereby prevented. Any tendency of the wire to fluctuate or yield which might result in undesirable or untrue reproduction of sound is also damped out. The effect of jar or shock of travel of the vehicle carrying the apparatus over the road is also minimized.

In order that the device may function accurately it is necessary that the wire be levelwound upon the winding reel 82. To accomplish this, I provide novel mechanism to shift the shaft 84 axially first in one direction then in the other. This mechanism functions to shift the shaft axially gradually during each revolution a distance equal to the diameter of the wire whereby successive windings of the wire upon the winding reel are laid on side by side. When one layer of wire is completed upon the reel 82, shaft 84 is then similarly shifted in the opposite direction to similarly lay down the next layer of wire.

Figure 8:
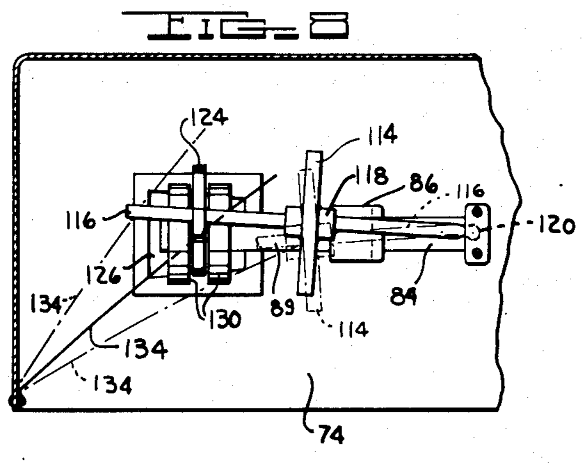
Figure 8 is a plan looking down on that portion of the magazine shown in Figure 7.

This levelwinding mechanism comprises a feed roller 114 which is freely journaled for rotation upon shaft 116 but held against axial shifting thereover by stops 118. One end of this shaft 116 is universally mounted at 120 within frame 88 to permit swinging movement of the shaft laterally from the solid line position to the dotted line position and vice versa all as shown in Figure 8. These two positions represent the two positions occupied by this shaft at different times and it will be seen that at each of these two positions the axis of shaft 116 and consequently the axis of rotation of the wheel 114 extends at an angle with respect to the axis of the shaft 84 upon which the reels 80 and 82 are mounted.

The wheel 114 is formed of resilient frictional material such as rubber or other suitable friction drive material and a tension spring 122 holds the wheel 114 snugly down aganist the shaft 84 to be rotated frictionally thereby and to in turn walk the shaft 84 axially first in one direction then in the other depending upon whether the wheel 114 is disposed at an angle to one side of shaft 84 or at an angle to the other side thereof as shown in Figure 8. The angle of the plane of the wheel 114 to the axis of shaft 84 is such as to shift the shaft axially a distance equal to the diameter of the wire 78 for each revolution of the shaft.

When the shaft 84 has been shifted axially a distance sufficient to lay down one layer of wire upon the winding reel or in other words a distance equal to the width of the wheel the shaft 122 is swung from the solid line position 78 to the dotted line position thereof or vice versa and the shaft 84 is then similarly walked back in the opposite direction.

This swinging of the shaft 116 results from its movement by an arm 124. One end of this arm is mounted upon the shaft 116 for slidable movement thereover and the opposite end of the arm is disposed within a guideway 125 formed in a guide block 126. This arm 124 is pivoted upon the shaft 84 to swing thereupon and also to permit rotation of the shaft 84 therein. Stops 130 are fixed on the shaft 84 on opposite sides of the arm 124 and hold this arm to shift with the shaft 84 as such shaft shifts axially. The lower end of the arm 124 may be shaped as shown at 132, Figure 7, to be received within and to travel through the guideway 125. The guideway 125 is a four-sided guideway. A leaf spring 134 is secured at one end to the casing 74 and this spring extends through an aperture 136 in the arm 124 as shown in Figures 7 and 9.

Figure 7:
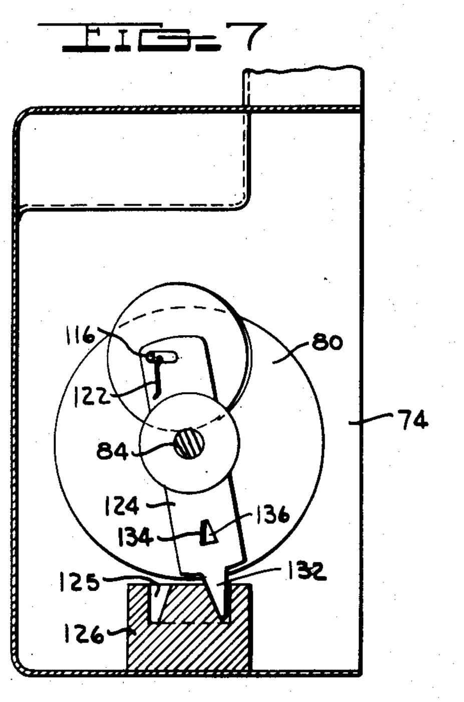
Figure 7 is an end elevation, partly in section, taken on the line 7—7 of Figure 2.
Figure 9:
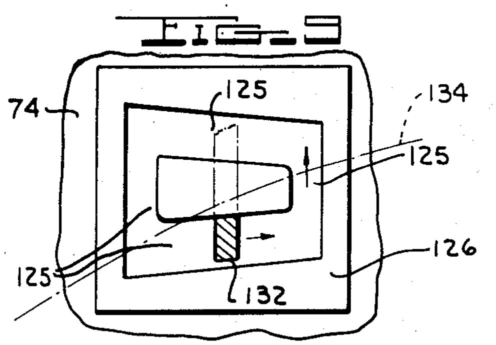
Figure 9 is a plan, partly in section, taken on the line 9—9 of Figure 2.

With the lower end of the arm disposed as shown in Figures 7, 8 and 9, it is moving against the resistance of the leaf spring 134 in the direction of the arrow through one long leg of the guideway as the shaft 84 is being moved axially. These long side legs of the guideway are of such length that the lower end of the arm 124 will arrive at the end of each leg when the shaft 84 reaches the end of its travel necessary to lay down one layer of wire across the width of the winding reel.

When the lower end of the arm reaches the end of the long leg of the guideway (Fig. 9) the leaf spring 134 which has been tensioned by such movement throws the lower end of the arm in the direction of the arrow across the short end leg of the guideway. The arm swings upon shaft 84 and the upper end of the arm is swung and swings the shaft 116 to move the wheel 114 to the opposite side of the shaft 84. The shaft 84 will then begin its reverse axial movement and the lower end of the arm 124 will travel in the direction of the arrow through the opposite long leg of the guideway. When the lower end of the arm reaches the opposite end of such other long leg of the guideway, another layer of wire will have been laid down on the winding reel and the leaf spring will have been tensioned by the movement of the arm and will throw the lower end of the arm across the short end leg of the guideway. This swings the arm upon shaft 84 and swings the upper end of the arm and the shaft 116 in the reverse direction shifting the wheel 114 to the opposite side of shaft 84. The operation may be continued until all the wire has been wound on the winding reel.

What I claim is:

1. A magnetic play back device divided into two separable parts, one part including a magnetically sensitive reproducing head and a rotatable driving member, the other part including a pair of reels adapted to support a wire for unwinding from one reel and winding upon the other reel and a rotatable driven capstan member intermediate said reels operable to unwind the wire from one reel and wind it upon the other reel, and means for mounting said two parts of the device in juxtaposition to one another with the reproducing head of the one part in magnetic relation to the wire as it passes over the capstan member of the other part and with the driving and driven members of the two parts in operatively coupled relationship.

2. A magnetic play back device divided into two separable parts, one part including a magnetically sensitive reproducing head and a rotatable driving member, the other part being a magazine part and including a pair of reels carrying a wire extending therebetween for unwinding movement from one reel and winding movement upon the other reel and a rotatable capstan frictionally engaging the wire to unwind it from one reel and wind it on the other reel, said magazine part adapted to be detachably coupled with the first part with its reproducing head in magnetic relation to the wire carried by the reels and its driving member operatively coupled with the capstan, the reproducing head of the first part being carried by an arm which projects into the magazine part when the two parts are coupled together and supports the head to overhang the wire where it passes over the capstan.

3. In magnetic record apparatus, a supply reel and a take-up reel of larger diameter mounted on a common shaft, one of said reels being nonrotatably fixed on said shaft and the other of said reels being rotatable thereon, smoothly operating friction means controlling relative rotation between said other reel and said shaft, a record wire extending between said reels, a capstan frictionally engaging said wire intermediate said reels, means driving said capstan at uniform speed, and a magnetic head engaging said wire where it passes over said capstan.

4. Structure as defined in claim 3 in which said friction means comprises a brake shoe carried by said other reel and spring means urging said shoe into engagement with said shaft.

5. In magnetic record apparatus, a supply reel and a take-up reel mounted on a common shaft, means mounting said shaft for axial and rotational movement, stationary guide means located radially outwardly from each of said reels, a record wire extending between said reels and positioned by said guide means, a driving capstan frictionally engaging said wire intermediate said guide means and effective to draw wire from said supply reel and to rotate said supply reel and shaft, level wind feed means comprising a friction disc engageable with said shaft at opposite oblique angles, and means operable in response to predetermined axial movement of said shaft to reverse the angular engagement of said disc, said last means comprises a spring operable during travel of said shaft in either direction to bias said friction disc toward reversal, and cam means including a trackway effective to permit abrupt reversal of said friction disc at the ends of the axial stroke.

6. A magnetic record apparatus divided into two separable parts; one part including a magnetic head and a rotatable driving member; the other part being a detachable magazine comprising a pair of storage devices containing an elongated record element, and a rotatable driven capstan frictionally engaged with said element intermediate said devices operable to transfer said element from one of said devices to the other, the energy to effect such transfer being solely supplied as the result of the frictional engagement between said capstan and said element, means for mounting said magazine on said one part with said head in magnetic relation to a portion of said element intermediate said devices and said driving member and said capstan in operatively coupled relationship.

7. A magnetic record apparatus divided into two separable parts; one part including a magnetic head and a rotatable driving member; the other part being a detachable magazine comprising a pair of reels containing an elongated record element and a rotatable driven capstan frictionally engaged with said record element intermediate said reels, one of said reels being frictionally driven from the other of said reels, and said other reel being driven solely by the withdrawal of said record element by said capstan, means for mounting said magazine on said one part with said head in magnetic relation to a portion of said element intermediate said devices and said driving member and said capstan in operatively coupled relationship.

8. A magnetic play back device divided into two separable parts, one part including a magnetically sensitive reproducing head and a rotatable driving member, the other part being a magazine part and including a pair of reels carrying a wire extending therebetween for unwinding movement from one reel and winding movement upon the other reel and a rotatable capstan frictionally engaging the wire to unwind it from one reel and wind it on the other reel, said magazine part adapted to be detachably coupled with the first part with its reproducing head in magnetic relation to the wire carried by the reels and its driving member operatively coupled with the capstan, the reproducing head of the first part projecting into the magazine into magnetic relation with a portion of said wire intermediate said reels when the two parts are assembled together.

9. In magnetic record apparatus, a supply reel and a take-up reel mounted on a common shaft, means mounting said shaft for axial and rotational movement, stationary guide means located radially outwardly from each of said reels, a record wire extending between said reels and positioned by said guide means, a driving capstan frictionally engaging said wire intermediate said guide means and effective to draw wire from said supply reel and to rotate said supply reel and shaft, level wind feed means for advancing said shaft axially in accordance with rotation of said shaft, means operable during advance of said shaft in either direction to urge said level wind feed means toward reversal, and cam means operable to permit such reversal only at selected points of travel.

10. In magnetic record apparatus, a supply reel and a take-up reel mounted on a common shaft, means mounting said shaft for axial and rotational movement, stationary guide means located radially outwardly from each of said reels, a record wire extending between said reels and positioned by said guide means, means for rotating said shaft and said reels, level wind feed mechanism comprising a friction disc, means mounting said disc for movement between two limiting positions in which said disc engages said shaft at opposite oblique angles, a control member connected to said disc and movable axially with said shaft and including an apertured part, a leaf spring extending through the aperture in said part and in unstressed condition when said shaft is intermediate to limiting positions of axial movement, a trackway in which said part is movable, said trackway including spaced portions extending generally longitudinally of said shaft and portions interconnecting the ends of said first portions whereby movement of said shaft axially as a result of frictional engagement with said disc will bias said leaf spring in a direction to urge said part from one longitudinally extending trackway to the other.

11. In a magnetic record apparatus, a magnetic record element, a cylindrical capstan to the surface of which said record element conforms, a magnetic head adjacent said capstan in the zone where said record element conforms to the surface of said capstan, said magnetic head comprising spaced apart poles having flat coplanar surfaces occupying a plane parallel to the axis of said capstan and tangent to said record element, the gap between said poles extending transversely of said record element, the contact of each pole with the record element being limited to the tangent contact between the portion of the plane pole surface at the gap and the curved outer surface of the record element.

LAWRENCE H. CONNELL.

(References on following page)

References Cited in the file of this patent

UNITED STATES PATENTS

| Number | Name | Date |
|---|---|---|
| 334,809 | Robinson | Jan. 26, 1886 |
| 1,665,784 | Hornauer | Apr. 10, 1928 |
| 2,170,383 | Kines | Aug. 22, 1939 |
| 2,231,279 | Miron | Feb. 11, 1941 |
| 2,283,393 | Simons | May 19, 1942 |
| 2,418,543 | Camras | Apr. 8, 1947 |
| 2,438,222 | Lear | Mar. 23, 1948 |
| 2,468,601 | Long | Apr. 26, 1949 |
| 2,477,146 | Scherbatskoy | July 26, 1949 |
| 2,576,459 | Holzman | Nov. 27, 1951 |

FOREIGN PATENTS

| Number | Country | Date |
|---|---|---|
| 363,751 | Germany | July 20, 1919 |
| 407,053 | Great Britain | Mar. 9, 1934 |
| 650,836 | Germany | Oct. 4, 1937 |